F. W. BUCK.
AUTOMOBILE SIGNAL.
APPLICATION FILED OCT. 30, 1918.
1,313,463.
Patented Aug. 19, 1919.
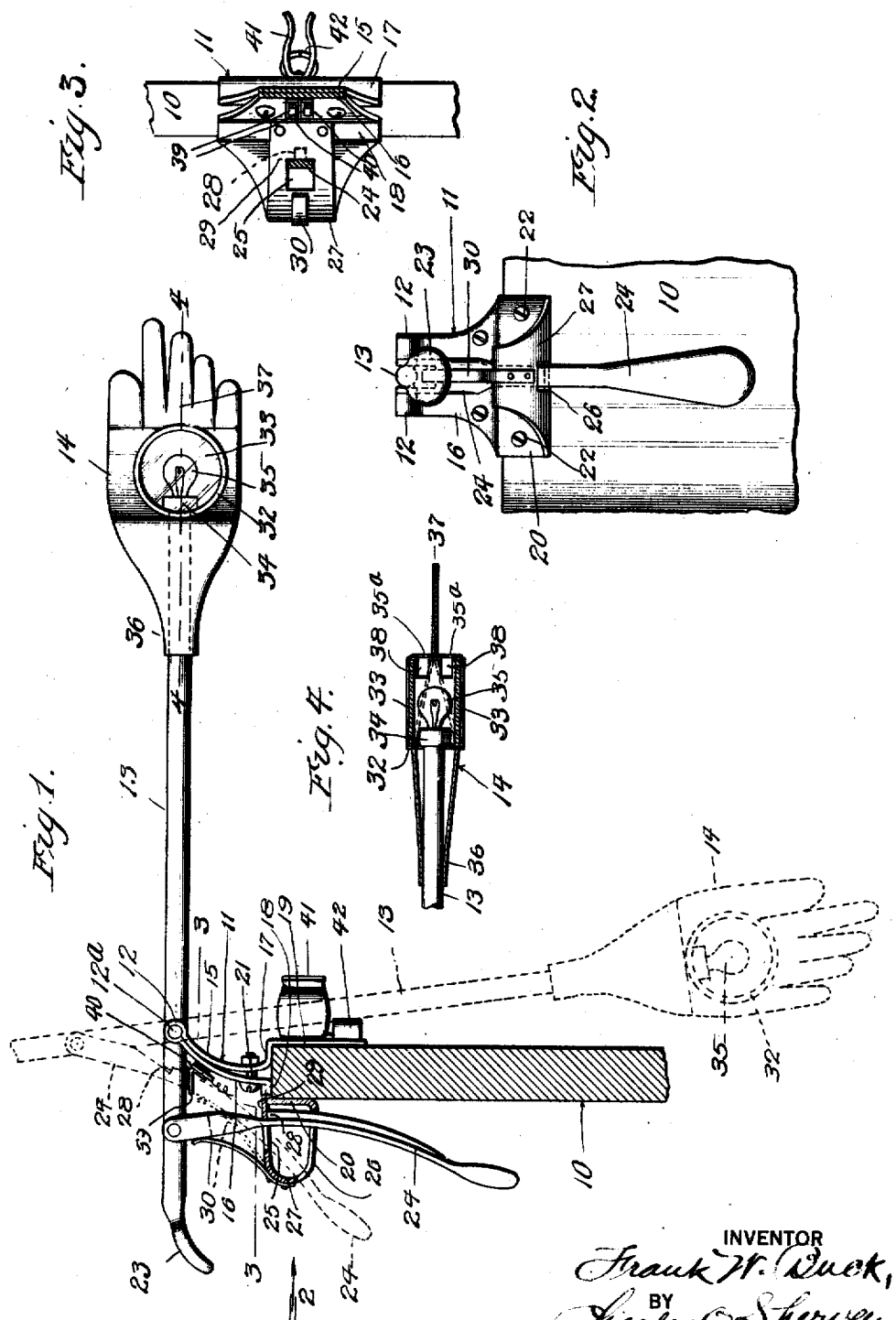
INVENTOR
Frank W. Buck,
BY
Charles O. Shervey
his ATTORNEY.

UNITED STATES PATENT OFFICE.

FRANK W. BUCK, OF DE KALB, ILLINOIS.

AUTOMOBILE-SIGNAL.

1,313,463.     Specification of Letters Patent.     Patented Aug. 19, 1919.

Application filed October 30, 1918. Serial No. 260,282.

*To all whom it may concern:*

Be it known that I, FRANK W. BUCK, a citizen of the United States, and a resident of De Kalb, Dekalb county, and State of Illinois, have invented certain new and useful Improvements in Automobile-Signals, of which the following is declared to be a full, clear, and exact description.

This invention relates to automobile signals, and its principal object is to provide an improved signal, operable from a place adjacent the driver's seat, for warning persons in front of the automobile or behind it that the driver intends to deviate from the present course which he is driving. Another object is to provide an automobile signal which is simple to operate, both in displaying the signal and returning it to inactive position. It is well known that in turning corners, the driver finds it quite important to have both hands free to manipulate the steering wheel and speed lever and that, a signal which can be set instantly and automatically locked in set position, has certain advantages, because it leaves the driver free to manage his automobile except for the instant that he manipulates the signal. A signal in which the signaling means can be instantly released from such locked position has particular advantages. One of the objects of this invention is to provide a signal which can be operated instantly in setting the same or in releasing the signaling means. Another object is to provide a signal in which the signaling means may be illuminated, whereby it will be plainly visible to persons in front and behind the automobile.

With these and other objects in view this invention consists in the several novel features hereinafter fully set forth and claimed:

The invention is clearly illustrated in the accompanying drawing, in which:—

Figure 1, is a side elevation of automobile signal embodying a simple form of the present invention, showing the same attached to a fragment of an automobile body, which is shown in cross section. Fig. 2, is an end view of the parts seen in Fig. 1, looking in the direction indicated by the arrow 2; Fig 3, is a horizontal section taken on line 3—3 of Fig 1, and Fig. 4 is a horizontal section taken on line 4—4 of Fig. 1.

Referring to said drawing, which illustrates a simple embodiment of the present invention, the reference character 10, designates a support which may comprise the body of an automobile, for instance the side thereof adjacent the driver's seat. The signal is detachably mounted on said support, and is arranged to fit on most all, if not all, automobile bodies.

A bracket 11, preferably constructed of sheet metal, and doubled upon itself, to provide perforated ears 12, is employed for pivotally supporting an arm 13, which is provided at its outer end with a figure, representing a hand, or other indicator 14. The two halves 15, 16 of the bracket extend down from the ears 12, to the top of the support 10, and thereat they are bent to extend in opposite directions to form horizontal flanges as at 17, 18, and their end portions are bent downward to form side flanges, as at 19, 20, which are adapted to engage with the sides of the support 10. The side flanges 19, 20 are clamped upon the support by bolts 21, which extend through the parts 15, 16 and have nuts upon their threaded ends. If desired, additional securing means in the form of screws 22, may be used in fastening the bracket to the support.

The upper end of the bracket, where the ears 12, are located, is forked to receive the arm 13, and a pivot pin $12^a$, extends through said ears and through the arm, and pivotally connects the arm with the bracket. The inner end of the arm is short as compared with its outer end and is formed with a handle 23, by means of which the long end of the arm may be quickly raised to signaling position.

A pawl or detent 24, is pivotally carried by the short end of the arm and extends down through slots 25, 26, formed in a guide member 27, which, conveniently, may comprise an end portion of the flange 20, which is bent upwardly, then curved back toward the flange 18, and secured to it by rivets or otherwise. The pawl or detent is provided with a shoulder 28, which, when the arm is raised in signaling position, engages with the underside of the part 29 of the guide, and holds said arm in its raised position. A spring 30, secured to the guide member and bearing against the pawl yieldingly presses the pawl in a direction to engage said shoulder with the underside of the part 29, whenever the arm is raised to signaling position.

If desired, the hand or other indicating figure 14, may contain an opening in which is secured a band 32. Glass panels or lenses 33, are secured to the edges of said band which panels or lenses may be colored red. An electric lamp socket 34, is secured in the casing formed by the band, and glass panels, and supports an incandescent lamp bulb 35.

Conveniently, the socket may be secured upon the end of the arm 13, which may be tubular, and which may extend into the casing formed between the band and glass panels. The figure 14, may be formed of sheet metal, shaped up to simulate a hand and the wrist portion 36, may be soldered or otherwise secured to the arm 13. The finger portion 37, may be flat and extends in a vertical direction in line with the center of the arm. Openings 38, are formed in the hand adjacent the flat portion 37, of the hand, which openings may be covered with transparent panels 35ᵃ, through which light from the lamp issues and illuminates the flat portion of the hand. Preferably the hand is painted or enameled white, so that it may be clearly visible at night as well as during the daytime.

Secured to the bracket 11 and arm 13, but insulated therefrom are make and break contact pieces 39, 40, the contact pieces 39, being wired to the lamp socket and the contact pieces 40, being wired to suitable source of electric energy, as for instance an electric battery such as is usually carried by an automobile.

A spring clip 41, is secured to the flange 19, of the support in line with the arm 13, and receives and retains the arm when it is permitted to fall from its raised position, and a spring buffer 42, is secured to said flange and receives the impact of the arm when dropped. The spring clip and buffer may be struck up from sheet metal and riveted or otherwise secured to the bracket.

In operation the arm 13, normally depends from the pivot pin 12ᵃ, as seen in dotted lines in Fig. 1, and is held in place by the spring clip 41, with the handle 23 in convenient position to be manipulated by the driver. Wishing to warn persons of his intention to turn, slacken up or stop, the driver brings his hand down upon the handle 23, and presses it downward, thereby raising the arm 13, and indicator 14. The spring 30 continually presses the pawl or detent toward the edge of the slot 25, and as the shoulder 28, of the said pawl passes the edge, the spring forces it underneath the part 29. When the handle is released, the shoulder, by reason of its engagement with the part 29 holds the arm in raised position. It is to be observed that the handle can be depressed in an instant, thereby leaving the driver free to manipulate the steering wheel and speed lever. After the driver has turned or speeded up or has stopped, he moves the pawl 24, out of engagement with the part 29, and the arm 13 falls by gravity to its inactive position where it is arrested by the buffer 42, and grasped by the spring clip 41.

The electric circuit between the contact pieces 39, 40, and battery or other source of electricity may have a switch (not shown) therein and when the circuit is closed, the lamp is lit whenever the contact pieces 39 contact with the contact pieces 40, thus when the arm reaches its raised position, the contact pieces 39, 40, complete the circuit through the lamp and the hand 14, is thereby illuminated, whereby it is made visible in the dark as well as the light. The circuit is broken, the moment the arm is dropped.

It is to be observed that the signal is reversible, that is to say, it may be secured at the left or right hand side of the automobile to accommodate a left or right hand side drive car.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new and desire to secure by Letters Patent:

1. An automobile signal, comprising a bracket, an arm pivotally supported on said bracket to swing in a vertical plane from an inactive position to and from a raised horizontal position, and having an indicating device at its outer end, and a handle at its inner end, said outer end being longer and heavier than its inner end, and a pawl pivotally secured to said arm and having a shoulder arranged to engage with said bracket when the arm is in raised position to thereby releasably hold said arm in raised position, said pawl being releasable independently of the handle.

2. An automobile signal, comprising a bracket arranged to be secured to an automobile body, a vertically swinging arm pivotally supported on said bracket to swing in a plane transverse to the length of the automobile body, from an inactive position to and from a raised horizontal position, said arm having a long outer portion provided with an indicating device at its end and a short inner portion provided with a handle, and a spring pressed pawl, pivotally secured to the short end of said arm and having a shoulder arranged to engage with said bracket when the arm is in raised position to thereby releasably hold said arm in raised position, said pawl being releasable independently of the handle.

3. An automobile signal, comprising a bracket, having a slotted guide, an arm pivotally supported on said bracket to swing in a vertical plane from an inactive position to and from a raised horizontal position and having an indicating device at its outer end and a handle at its inner end, and a spring pressed pawl pivotally secured to said arm and extending through the slots of said guide and having a shoulder arranged to engage with said guide when the arm is in raised position to thereby releasably hold said arm in raised position, said pawl being releasable independently of the handle.

4. An automobile signal, comprising a bracket, having a clamp for detachably securing it to the body of an automobile, an arm pivotally supported on said bracket to swing in a vertical plane from an inactive position to and from a raised horizontal position, and having an indicating device at its outer end, and a handle at its inner end, said outer end being longer and heavier than its inner end and a pawl pivotally secured to said arm and having a shoulder arranged to engage with said bracket when the arm is in raised position to thereby releasably hold said arm in raised position, said pawl being releasable independently of the handle.

5. An automobile signal, comprising a bracket arranged to be secured to an automobile body and having a spring clip and spring buffer on its outer side, an arm pivoted to said bracket and having a signaling device upon its outer end and arranged to be releasably held by said spring clip, and a pawl pivotally connected to said arm for releasably holding it in raised indicating position.

6. An automobile signal, comprising a bracket, an arm pivotally supported between its ends on said bracket to swing in a pivotal plane from an inactive position to and from a raised horizontal position and having an indicating device at its outer end, and a handle at its inner end, said outer end being longer and heavier than its inner end, and a spring pressed pawl pivotally secured to the inner end of said arm and having a shoulder arranged to engage said bracket when the arm is in raised position to thereby positively but releasably hold said arm in raised position, said pawl being capable of being manually swung out of engagement with said bracket.

FRANK W. BUCK.

Copies of this patent may be obtained for five cents each, by addressing the "Commissioner of Patents, Washington, D. C."